(12) United States Patent
Stahlhut et al.

(10) Patent No.: US 11,657,295 B2
(45) Date of Patent: May 23, 2023

(54) COGNITIVE AUTOMATION PLATFORM FOR DYNAMIC UNAUTHORIZED EVENT DETECTION AND PROCESSING

(71) Applicant: Bank of America Corporation, Charlotte, NC (US)

(72) Inventors: William August Stahlhut, The Colony, TX (US); Jesse S. Newsom, III, Charlotte, NC (US); Elena Kvochko, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 254 days.

(21) Appl. No.: 16/836,317

(22) Filed: Mar. 31, 2020

(65) Prior Publication Data

US 2021/0304017 A1    Sep. 30, 2021

(51) Int. Cl.
| | | |
|---|---|---|
| *G06N 5/02* | (2023.01) | |
| *G06N 5/04* | (2023.01) | |
| *G06Q 20/40* | (2012.01) | |
| *H04L 9/40* | (2022.01) | |
| *G06F 9/54* | (2006.01) | |

(52) U.S. Cl.
CPC .............. *G06N 5/02* (2013.01); *G06F 9/542* (2013.01); *G06N 5/04* (2013.01); *G06Q 20/401* (2013.01); *G06Q 20/407* (2013.01); *H04L 63/08* (2013.01); *G06Q 2220/00* (2013.01); *H04L 2463/082* (2013.01); *H04L 2463/102* (2013.01)

(58) Field of Classification Search
CPC . G06N 5/02; G06N 5/04; G06N 20/00; G06F 9/542; G06Q 20/401; G06Q 20/407; G06Q 2220/00; G06Q 20/108; G06Q 20/4016; G06Q 20/405; H04L 63/08; H04L 2463/082; H04L 2463/102; H04L 63/10
See application file for complete search history.

(56) References Cited

U.S. PATENT DOCUMENTS

| | | | |
|---|---|---|---|
| 6,314,410 B1 * | 11/2001 | Tackett ................. | G06N 20/00 706/11 |
| 8,145,562 B2 | 3/2012 | Wasserblat et al. | |
| 9,883,040 B2 | 1/2018 | Strong et al. | |
| 10,110,738 B1 | 10/2018 | Sawant et al. | |
| 10,122,815 B1 * | 11/2018 | Stroebel ............... | H04L 67/562 |
| 10,127,409 B1 * | 11/2018 | Wade ..................... | H04K 3/00 |

(Continued)

*Primary Examiner* — Aravind K Moorthy
(74) *Attorney, Agent, or Firm* — Banner & Witcoff, Ltd.

(57) ABSTRACT

Systems for using cognitive automation techniques to detect unauthorized events are provided. In some examples, a request for a product or service (e.g., event processing) may be received. The request may be received electronically, via a telephone communication, in person, or the like. The request may be analyzed (e.g., using a cognitive automation model) to determine whether it is potentially unauthorized. If so, one or more requests for additional information may be generated or identified. For instance, requests for authentication information, responses to questions or a series of questions, or the like, may be generated. In some examples, the additional information requested may be identified using the cognitive automation model. Responses to the request for additional information may be analyzed (e.g., using the cognitive automation model) to determine whether the request for the product or service is unauthorized. If so, processing the request may be prevented.

19 Claims, 13 Drawing Sheets

(56) References Cited

U.S. PATENT DOCUMENTS

| | | | |
|---|---|---|---|
| 10,462,080 B1* | 10/2019 | Jones | H04L 67/10 |
| 10,484,532 B1 | 11/2019 | Newman et al. | |
| 10,548,001 B1* | 1/2020 | Shelley | H04L 65/1063 |
| 10,623,401 B1* | 4/2020 | Yager | H04W 12/68 |
| 10,798,583 B1* | 10/2020 | Xu | G10L 25/51 |
| 10,864,444 B1* | 12/2020 | Rao | A63F 13/35 |
| 10,891,628 B1* | 1/2021 | Flowers | G06Q 30/0261 |
| 10,979,423 B1* | 4/2021 | Garner, IV | G10L 17/22 |
| 10,986,504 B1* | 4/2021 | Smith | G06Q 20/3221 |
| 11,086,644 B1* | 8/2021 | Balaram | G06F 16/245 |
| 11,140,738 B1* | 10/2021 | Rane | H04W 76/19 |
| 11,157,906 B1* | 10/2021 | Smith | G06Q 20/405 |
| 11,205,428 B1* | 12/2021 | Bao | G06F 40/30 |
| 11,250,840 B1* | 2/2022 | Teig | G06N 3/084 |
| 2007/0255818 A1* | 11/2007 | Tanzer | G06F 21/552 |
| | | | 709/224 |
| 2012/0254333 A1* | 10/2012 | Chandramouli | G06F 40/10 |
| | | | 709/206 |
| 2013/0125211 A1* | 5/2013 | Cashman | H04L 63/102 |
| | | | 726/4 |
| 2013/0226698 A1* | 8/2013 | Cochinwala | G06Q 30/06 |
| | | | 705/14.53 |
| 2013/0311835 A1* | 11/2013 | Dunne | G06F 11/3414 |
| | | | 714/E11.195 |
| 2015/0186872 A1* | 7/2015 | Sobol | G06Q 20/351 |
| | | | 705/41 |
| 2015/0256550 A1* | 9/2015 | Taylor | H04W 4/30 |
| | | | 726/23 |
| 2016/0085857 A1* | 3/2016 | Clark | G06F 16/338 |
| | | | 707/722 |
| 2016/0125751 A1* | 5/2016 | Barker | G06F 16/3332 |
| | | | 434/322 |
| 2017/0061115 A1* | 3/2017 | Kalra | G06F 21/36 |
| 2018/0089680 A1* | 3/2018 | Castinado | G06Q 20/4014 |
| 2018/0276543 A1* | 9/2018 | Parrotta, Jr | G06F 3/04842 |
| 2018/0365786 A1* | 12/2018 | Thompson | H04L 9/3236 |
| 2019/0019169 A1* | 1/2019 | McLaughlin | G06Q 20/401 |
| 2019/0037081 A1 | 1/2019 | Rao et al. | |
| 2019/0089725 A1* | 3/2019 | Anachi | G06N 20/00 |
| 2019/0147349 A1* | 5/2019 | Ng | G06N 20/00 |
| | | | 706/12 |
| 2019/0158477 A1* | 5/2019 | Nagaratnam | H04W 12/06 |
| 2019/0190895 A1* | 6/2019 | Adams | H04N 1/00127 |
| 2019/0207953 A1* | 7/2019 | Klawe | G06Q 20/20 |
| 2019/0215663 A1* | 7/2019 | Lee | H04M 1/72454 |
| 2019/0268329 A1* | 8/2019 | Toth | G06F 21/6209 |
| 2019/0303266 A1* | 10/2019 | Bonnell | G06F 11/302 |
| 2019/0392536 A1* | 12/2019 | Rice | H04L 67/535 |
| 2019/0394195 A1* | 12/2019 | Chari | G06F 21/32 |
| 2020/0013062 A1* | 1/2020 | Pratt | G06Q 20/065 |
| 2020/0027007 A1* | 1/2020 | Hirzel | G06N 20/00 |
| 2020/0065459 A1* | 2/2020 | Himabindu | G06F 21/316 |
| 2020/0159907 A1* | 5/2020 | Johnson | G06T 5/005 |
| 2020/0169389 A1* | 5/2020 | Zuo | H04L 9/0643 |
| 2020/0193266 A1* | 6/2020 | Scheidegger | G06N 3/04 |
| 2020/0293977 A1* | 9/2020 | Carter | G06Q 10/063112 |
| 2020/0304481 A1* | 9/2020 | Rathore | H04L 63/105 |
| 2020/0334680 A1* | 10/2020 | Vanga | G06F 21/554 |
| 2020/0372428 A1* | 11/2020 | Liu | G08G 1/20 |
| 2020/0382492 A1* | 12/2020 | Kalaboukis | H04L 63/107 |
| 2021/0004803 A1* | 1/2021 | Rule | G06Q 20/204 |
| 2021/0029107 A1* | 1/2021 | Parkinson | H04L 63/0853 |
| 2021/0035040 A1* | 2/2021 | Thomas | G06Q 10/0633 |
| 2021/0136066 A1* | 5/2021 | Llamas Virgen | H04L 63/0876 |
| 2021/0157855 A1* | 5/2021 | Boxwell | G06F 16/90332 |
| 2021/0158814 A1* | 5/2021 | Hussain | G10L 15/1815 |
| 2021/0200954 A1* | 7/2021 | Dsouza | G06F 16/2228 |
| 2021/0233522 A1* | 7/2021 | Kikin-Gil | G10L 15/183 |
| 2021/0271662 A1* | 9/2021 | Muse | G16H 10/60 |
| 2021/0281682 A1* | 9/2021 | Agarwal | G06F 3/0346 |

* cited by examiner

400 —

Potential Unauthorized Request

Additional Information;
Biometric data
Purpose of request?
Is this at the request of another?

Your Request Has Been Identified As Unauthorized.

No Further Processing Will Occur

Appeal

COGNITIVE AUTOMATION PLATFORM FOR DYNAMIC UNAUTHORIZED EVENT DETECTION AND PROCESSING

BACKGROUND

Aspects of the disclosure relate to electrical computers, systems, and devices for dynamic unauthorized event detection and processing functions based on cognitive automation.

Large scale enterprises often receive thousands or even hundreds of thousands of requests each day for products or services. Verifying whether these requests are authorized or unauthorized entails a large undertaking and can be difficult when based on only the information provided in the request. Further, as more requests are received electronically, the ability to verify a user's authenticity or sincerity in requesting a product or service becomes even more difficult to determine. Accordingly, it may be advantageous to execute cognitive automation functions to evaluate events to determine whether they are unauthorized.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with detecting and processing unauthorized events.

In some examples, a request for a product or service (e.g., event processing) may be received. The request may be received electronically, via a telephone communication, in person, or the like. The request may include data associated with the user requesting the product or service, and the like. The request may be analyzed (e.g., using a cognitive automation model) to determine whether it is potentially unauthorized.

If so, one or more requests for additional information may be generated or identified. For instance, requests for authentication information, responses to questions or a series of questions, or the like, may be generated. In some examples, the additional information requested may be identified using the cognitive automation model.

Responses to the request for additional information may be analyzed (e.g., using the cognitive automation model) to determine whether the request for the product or service is unauthorized. If so, processing the request may be prevented.

In executing one or more cognitive automation functions, various technical advantages may be realized. For example, one technical advantage of using cognitive automation in detection of unauthorized events is that such techniques may expedite computing methods corresponding to recommendations. Specifically, this approach may prevent users from spending time repeatedly working through a decision tree to identify potential unauthorized activity, evaluate further features of the request to provide more in-depth analysis, and improve accuracy and efficiency in detecting unauthorized events by leveraging more information or data than a human could process in evaluations.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 4 illustrates one example user interface including an indication of a potentially unauthorized event and a request for additional information according to one or more aspects described herein;

FIG. 5 illustrates an example user interface including an indication of detection of an unauthorized event according to one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, large enterprise organizations often receive thousands or tens of thousands of requests for products or services every day. For instance, financial institutions processes thousands or maybe millions of requests for products or services each day (e.g., withdrawals, opening new accounts, wire transfers, requests for a loan, requests for a mortgage, and the like). Confirming that each request is authorized (e.g., is truly being performed by the user or requesting user and not a person posing as the user, is willingly performed by the user and not under duress or in response to a request from an unauthorized actor, or the like) can be time consuming and prone to errors, particularly when requests are received electronically. Accordingly, the arrangements described herein provide use of cognitive automation techniques to evaluate requests for products or services to determine whether they are unauthorized.

In some examples, a request may be received and processed to determine whether the request is potentially unauthorized. For instance, keywords, sequences of keywords, typing patterns, tone, historical requests, and the like, may be analyzed (e.g., using cognitive automation techniques) to identify potentially unauthorized events. In some examples, additional information, such as responses to one or more questions or additional authentication information may be requested. The response data may be received and analyzed (e.g., using cognitive automation techniques) to determine whether the potentially unauthorized event is unauthorized. The event may then be processed or prevented from further processing based on the analysis.

These and various other arrangements will be discussed more fully below.

Figure 1A:
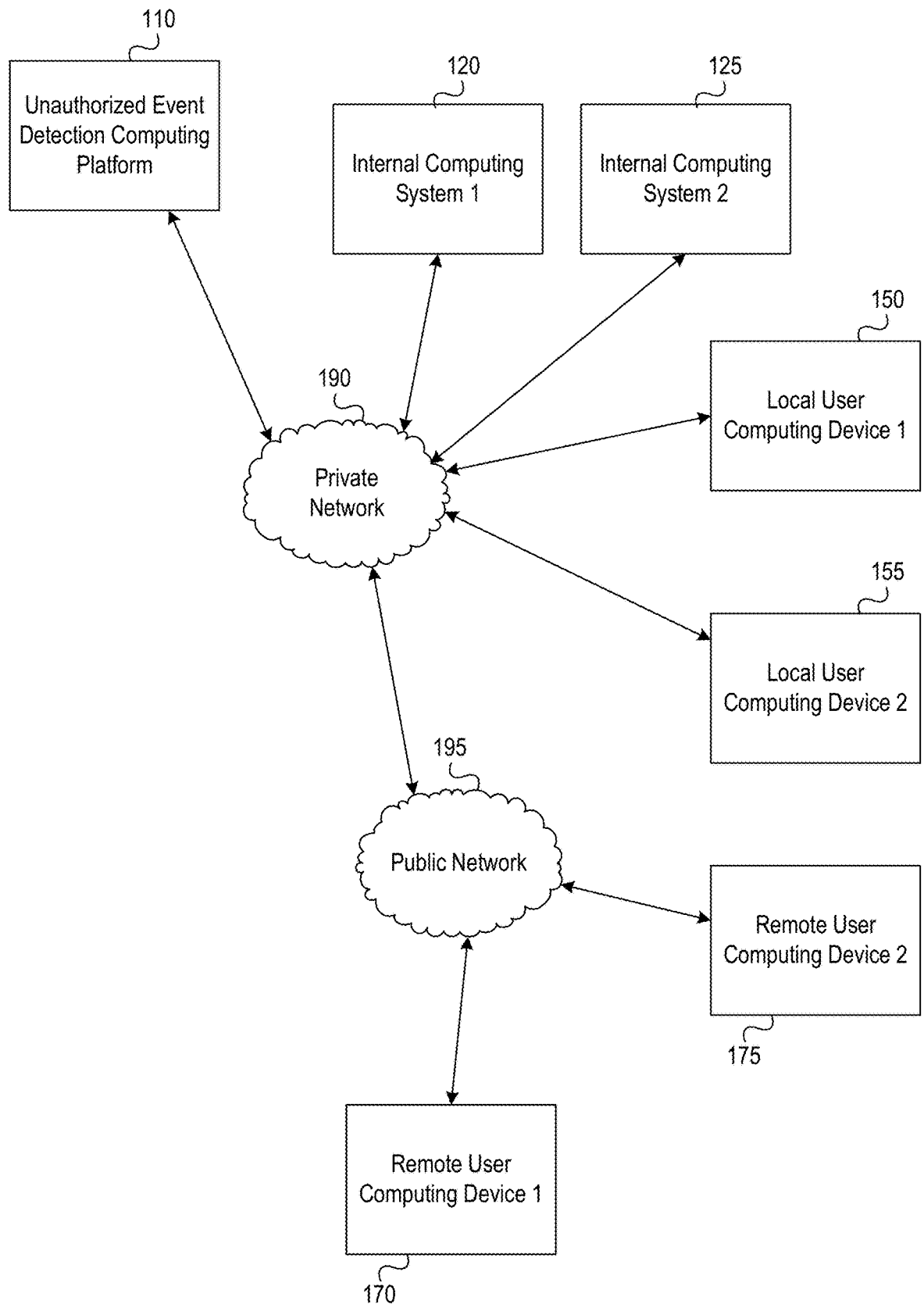
FIGS. 1A and 1B depict an illustrative computing environment for implementing dynamic unauthorized event detection functions in accordance with one or more aspects described herein.
Figure 1B:
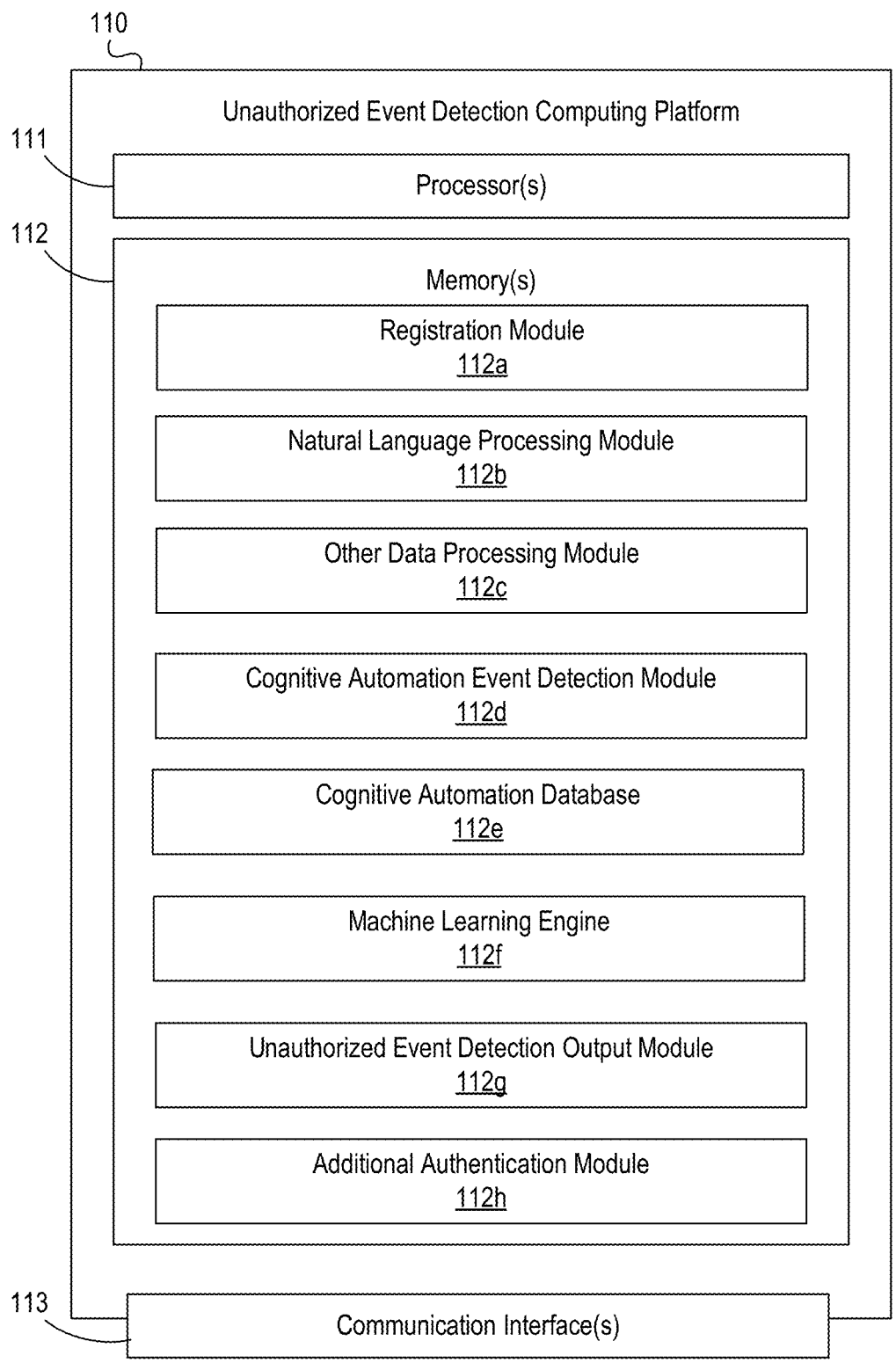

FIGS. 1A-1B depict an illustrative computing environment for implementing and using cognitive automation techniques for dynamic unauthorized event detection and control in accordance with one or more aspects described herein. Referring to FIG. 1A, computing environment 100 may include one or more computing devices and/or other computing systems. For example, computing environment 100 may include unauthorized event detection computing platform 110, internal computing system 1 120, internal computing system 2 125, a first local user computing device 150, a second local user computing device 155, a first remote user computing device 170, and a second remote user computing device 175. Although two internal computing systems 120, 125 are shown, more or fewer entity computing devices may be used without departing from the invention.

Unauthorized event detection computing platform 110 may be configured to provide intelligent, dynamic, unauthorized event detection and control functions based on cognitive automation techniques. Unauthorized event detection computing platform 110 may be a computer system that includes one or more computing devices (e.g., servers, server blades, or the like) and/or other computer components (e.g., processors, memories, communication interfaces) that may be used to implement cognitive automation, machine learning algorithms, artificial intelligence, or the like to recognize patterns and generate or identify potential instances or unauthorized access or unauthorized requests for service or products and further process and/or control actions taken in response. In some instances, the unauthorized event detection computing platform 110 may be maintained by an enterprise organization (e.g., a financial institution, or the like) and may receive data from one or more sources, such as internal computing device 1 120, internal computing device 2 125, local user computing device 150, local user computing device 155, remote user computing device 170, remote user computing device 175, and the like. Unauthorized event detection computing platform 110 may analyze the data using, for instance, cognitive automation to identify any potential unauthorized activity events, generate mitigating actions to execute in response, execute mitigating actions, and the like.

For instance, a request for a product or service may be received by the unauthorized event detection computing platform 110 (e.g., via one or more internal computing systems, such as internal computing system 1 120, internal computing system 2 125, or the like). In some examples, the request may be received from a user via a computing device of the user (e.g., remote user computing device 170, remote user computing device 175, or the like which may include user computing devices such as a smartphone, tablet, wearable device, laptop, desktop, or the like. In some examples, the request may be received via a telephone service of the entity and from a user via telephone. In still other examples, the request may be received in-person (e.g., by a teller or other banking associate at a branch location).

In some examples, data associated with the request for product or service may be received and analyzed. For instance, if the request is via phone or in-person, natural language processing may be used to analyze the request of the user to identify particular terms or keywords, identify tone, sentiment, or the like, review speech patterns (e.g., as compared to baseline patterns previously stored by the system), and the like. Additionally or alternatively, if the request or portion of the request is received via computing device (e.g., via online or mobile applications, via text or email, or the like), the content of the request may be analyzed to identify metadata and/or identify keywords or terms, typing patterns used, and the like.

The data associated with the request may be analyzed using a cognitive automation model to identify sequences or patterns that may correspond to unauthorized activity. If the data aligns with sequences or patterns that may correspond to unauthorized activity, the request may be flagged as potentially unauthorized, In response, one or more mitigating actions may be identified and executed. For instance, the cognitive automation model may be used to identify one or more appropriate mitigating actions or sequences of actions and may execute the actions, cause one or more other devices to execute the actions, prompt a user to execute the actions, and the like.

For instance, the cognitive automation model may identify one or more questions or sequences of question to present to the requesting user in response to the determination that the request is flagged as potentially unauthorized. In some examples, the questions may include requests for additional authentication information (e.g., password, response to pre-stored challenge questions, or the like). Additionally or alternatively, the identified questions may include prompts for the user to provide additional information about the request, why the request is being made, or the like. These questions may aid in obtaining additional information that may be analyzed (e.g., using the cognitive automation model) to determine whether the event is unauthorized or was incorrectly flagged as potentially unauthorized. Various other questions or other prompts may be identified, as will be discussed more fully herein.

In some examples, the data may be received by an internal computing system, such as internal computing system 1 120, internal computing system 2 125, or the like. For instance, internal computing system 1 120 and/or internal computing system 2 125 may host, execute or support one or more applications configured to receive user requests for products or services. For instance, internal computing system 1 120, internal computing system 2 125, or the like, may be configured to host, execute or support one or more online banking applications, mobile banking applications, telephone customer service applications, or the like. Internal computing system 1 120 and/or internal computing system 2 125 may receive data (e.g., from a user or user computing device) and may transmit the data to the unauthorized event detection computing platform 110 for processing.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to access the unauthorized event detection computing platform 110, internal computing system 1 120, internal computing system 2 125, or the like to control parameters associated with unauthorized event detection computing platform 110. Additionally or alternatively, internal computing system 1 120 and/or internal computing system 2 125 may be a computing device associated with a customer service representative, banking associate, or the like, operating at an entity location. Local user computing device 150, 155 may be used to input data received from a user (e.g., via an in-person transaction request, phone request, or the like) and may display or otherwise provide one or more questions, sequences of questions, requests for additional information, and the like, generated or identified by the cognitive automation model for presentation to the user (e.g., via the customer service representative, banking associate, or the like).

The remote user computing device 170 and remote user computing device 175 may be used to communicate with, for example, one or more systems, computing platforms, devices, or the like, to request a product or service (e.g., receive user input from a user that may be transmitted to one or more other computing devices or platforms, function as a telephone through which the user may request one or more products or services, or the like). In some examples, remote user computing device 170, 175 may include one or more other remote computing devices, such as computing platforms, server computers, and the like, that may be owned or operated by another entity and may provide data to the system. For instance, remote user computing device 170, 175 may include a remote computing device that may provide one or more external feeds (e.g., continuous feeds, batch transfers, or the like) including available data related to, for instance, current scams being perpetrated in the marketplace. This data may be used to train or update the cognitive automation model to ensure evaluation for the most current potential unauthorized activities are executed. In some examples, the remote user computing device 170, 175 may be associated with another entity (e.g., different from the entity implementing the computing platform 110) and one or more outputs (e.g., unauthorized activity evaluation outputs) may be transmitted to the remote user computing device 170, 175 (e.g., on a subscription basis).

Local user computing device 1 150, local user computing device 2 155, remote user computing device 1 170, and/or remote user computing device 2 175 may be configured to display and/or execute one or more questions, sequences of questions, requests for additional information, or the like. For instance, if a mobile application is executing on remote user computing device 170, and is used to request a product or service that is flagged as potentially unauthorized, one or more questions, sequences of questions, requests for additional information, or the like, generated by the cognitive automation model may be displayed to the user via a display of the remote user computing device 170.

Computing environment 100 also may include one or more computing platforms. For example, and as noted above, computing environment 100 may include unauthorized event detection computing platform 110. As illustrated in greater detail below, unauthorized event detection computing platform 110 may include one or more computing devices configured to perform one or more of the functions described herein. For example, unauthorized event detection computing platform 110 may include one or more computers (e.g., laptop computers, desktop computers, servers, server blades, or the like).

As mentioned above, computing environment 100 also may include one or more networks, which may interconnect one or more of unauthorized event detection computing platform 110, internal computing system 1 120, internal computing system 2 125, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, unauthorized event detection computing platform 110, internal computing system 1 120, internal computing system 2 125, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect unauthorized event detection computing platform 110, internal computing system 1 120, internal computing system 2 125, local user computing device 150, local user computing device 155, and one or more other computing devices and/or computer systems that are used by, operated by, and/or otherwise associated with the organization. Public network 195 may connect private network 190 and/or one or more computing devices connected thereto (e.g., unauthorized event detection computing platform 110, internal computing system 1 120, internal computing system 2 125, local user computing device 150, local user computing device 155) with one or more networks and/or computing devices that are not associated with the organization. For example, remote user computing device 170, remote user computing device 175, might not be associated with an organization that operates private network 190 (e.g., because remote user computing device 170, and/or remote user computing device 175, may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect remote user computing device 170, and/or remote user computing device 175, to private network 190 and/or one or more computing devices connected thereto (e.g., unauthorized event detection computing platform 110, internal computing system 1 120, internal computing system 2 125, local user computing device 150, local user computing device 155). In some examples, unauthorized event detection computing platform 110 may communicate with remote user computing device 170, 175 (e.g., via public network 195) to receive external data, transmit, for instance, unauthorized detection evaluation outputs to one or more other entities (e.g., as a subscription based service), or the like.

Referring to FIG. 1B, unauthorized event detection computing platform 110 may include one or more processors 111, memory 112, and communication interface A data bus may interconnect processor(s) 111, memory 112, and communication interface 113.

Communication interface 113 may be a network interface configured to support communication between unauthorized event detection computing platform 110 and one or more networks (e.g., private network 190, public network 195, or the like). Memory 112 may include one or more program modules having instructions that when executed by processor(s) 111 cause unauthorized event detection computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of unauthorized event detection computing platform 110 and/or by different computing devices that may form and/or otherwise make up unauthorized event detection computing platform 110.

For example, memory 112 may have, store and/or include a registration module 112a. Registration module may store instructions and/or data that may cause or enable the unauthorized event detection computing platform 110 to receive data related to users and/or one or more user computing devices, systems, users, and the like. For instance, one or more users may register with the system and provide data associated with one or more mobile devices associated with the user, contact information, user identifying information, user preferences, and the like.

Unauthorized event detection computing platform 110 may further have, store and/or include natural language processing module 112b. Natural language processing module 112b may store instructions and/or data that may cause or enable the unauthorized event detection computing platform 110 to perform one or more natural language processing functions on data received from user (e.g., audio data from telephone call requests for products or services, text data from online resources or systems, or the like). The natural language processing module 112b may execute one or more natural language processing functions to identify one or more keywords, sentiment, tone, sequences of keywords, typing patterns, texting patterns, voice patterns, and the like, which may be input into the cognitive automation model to identify potential unauthorized events.

Unauthorized event detection computing platform 110 may further have, store and/or include other data processing module 112c. Other data processing module 112c may store instructions and/or data that may cause or enable the unauthorized event detection computing platform 110 to receive and/or process other data that may be used by the cognitive automation model to generate or identify potential unauthorized events, questions for further information gathering, and the like. For instance, customer history data may be retrieved (e.g., from internal computing system 1 120, internal computing system 2 125, or the like) and processed to aid in identifying potential unauthorized activity. For example, if a user requests a wire transfer, historical data for that customer may be retrieved and, if a wire transfer has been requested less than a threshold number of times in the past, one or more requests for additional information, questions or sequences of questions may be identified and presented to the user to aid in confirming that the request is not unauthorized. Various other examples of data and processing of data may be used without departing from the invention.

Unauthorized event detection computing platform 110 may further have, store and/or include cognitive automation event detection module 112d. Cognitive automation event detection module 112d may store instructions and/or data that may cause or enable the unauthorized event detection computing platform 110 to execute advanced cognitive automation techniques related to unauthorized event detection, as discussed in greater detail herein. Cognitive automation database 112e may store information used by cognitive automation event detection module 112d and/or unauthorized event detection computing platform 110 in application of cognitive automation techniques related to detecting potential unauthorized events, evaluating potential unauthorized events to determine whether it is actually unauthorized, and the like.

Unauthorized event detection computing platform 110 may further have, store and/or include a machine learning engine 112f and machine learning datasets. Machine learning engine 112f may store instructions and/or data that may cause or enable unauthorized event detection computing platform 110 to analyze data to identify patterns or sequences within data in order to detect potential unauthorized activity, generate or identify one or more requests for additional information, process responses to those requests for additional information to determine whether a request is unauthorized, and the like. The machine learning datasets may be generated based on analyzed data (e.g., data from previously received data, and the like), raw data, and/or received from one or more outside sources.

The machine learning engine 112f may receive data and, using one or more machine learning algorithms, may generate one or more machine learning datasets. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention.

Unauthorized event detection computing platform 110 may further have, store and/or include unauthorized event detection output module 112g. Unauthorized event detection output module 112g may store instructions and/or data that may cause or enable the unauthorized event detection computing platform 110 to generate outputs associated with a determination of whether a request is potentially unauthorized, one or more requests for additional information, outcomes of processing of response data received in response to the requests for additional information, determination of whether an event is unauthorized, and the like. For instance, unauthorized event detection output module 112g may generate one or more user interfaces or other notifications indicating an outcome of processing the data received (e.g., based on cognitive automation techniques). The generated user interfaces may be transmitted to one or more computing devices for display and/or may include one or more instructions or commands that may be executed by a computing device to which the interface is transmitted.

Unauthorized event detection computing platform 110 may further have, store and/or include additional authentication module 112h. Additional authentication module 112h may store instructions and/or data that may cause or enable the unauthorized event detection computing platform 110 to process response data to determine whether a user is authenticated, whether the response data matches pre-stored or expected data, and the like. In some examples, a user may pre-store one or more additional pieces of authentication data (e.g., biometric data, challenge question data, and the like). Additionally or alternatively, other data associated with the user and stored by the entity (e.g., in internal computing system 1 120, internal computing system 2 125, or the like) may be used to generate one or more requests for additional information, evaluate response data, and the like. These processes (e.g., retrieving data, receiving response data, comparing response data to retrieved data, and the like) may be executed or performed by the additional authentication module 112h in at least some examples.

FIGS. 2A-2H depict one example illustrative event sequence for implementing and using cognitive automation techniques for unauthorized event detection functions in accordance with one or more aspects described herein. The events shown in the illustrative event sequence are merely one example sequence and additional events may be added, or events may be omitted, without departing from the invention.

Figure 2A:
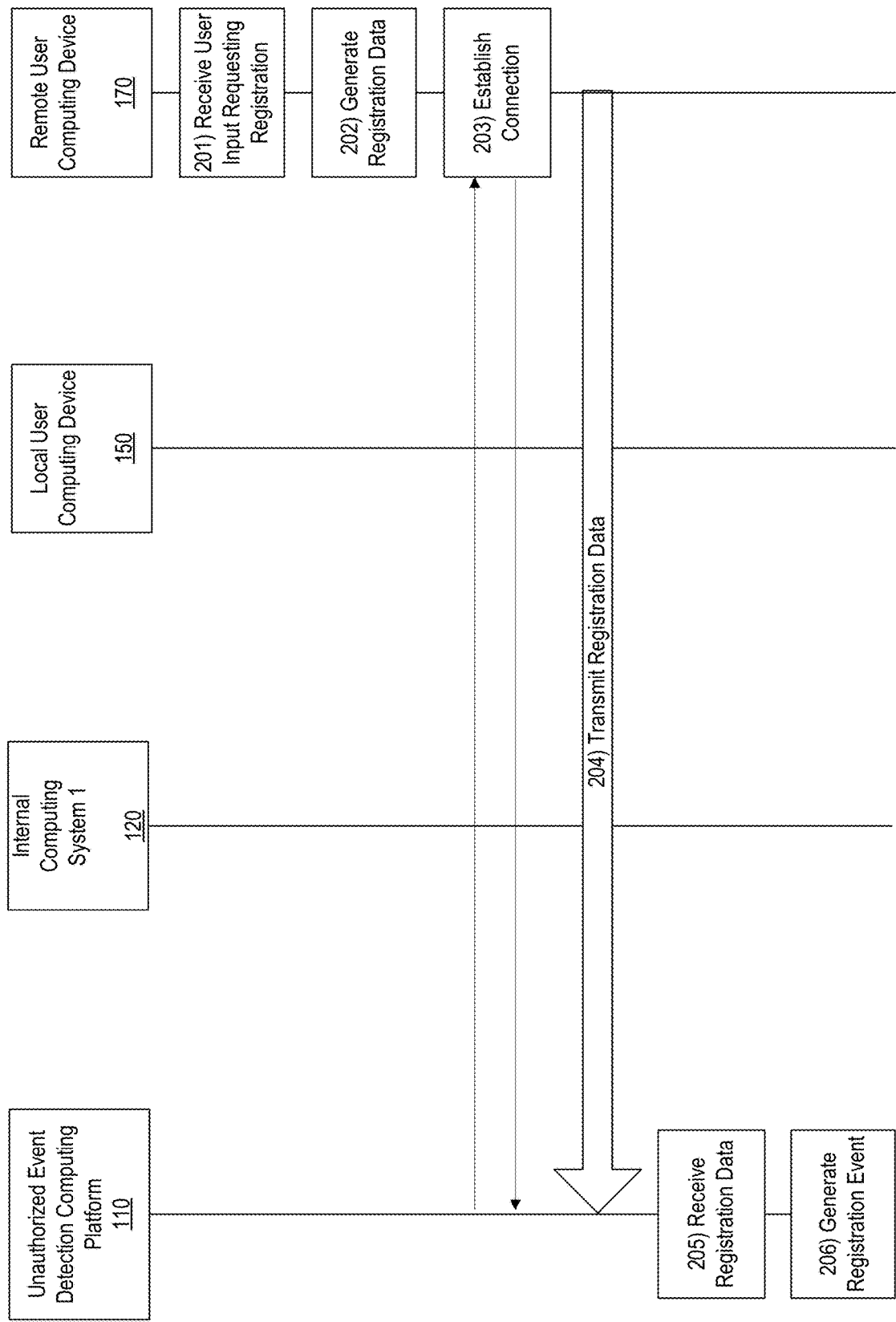
FIGS. 2A-2G depict an illustrative event sequence for implementing dynamic unauthorized event detection functions in accordance with one or more aspects described herein.

With reference to FIG. 2A, at step 201, user input requesting registration may be received. For instance, user input requesting registration of one or more users and associated computing devices may be received. The request for registration may include identification of the user, contact information of the user, authentication information of the user (e.g., username and password, personal identification number, biometric data, challenge question data, and the like), user permission, and the like. Although FIG. 2A illustrates registration data being received from one remote user computing device 170, registration information may be received from a plurality of remote user computing devices, each associated with one or more different users.

At step 202, registration data may be generated. For instance, data associated with the user, computing devices, or the like, being registered may be generated.

At step 203, a connection may be established between the remote user computing device 170 and the unauthorized event detection computing platform 110. For instance, a first wireless connection may be established between the unauthorized event detection computing platform 110 and remote user computing device 170. Upon establishing the first wireless connection, a communication session may be initiated between unauthorized event detection computing platform 110 and remote user computing device 170.

At step 204, the registration data may be transmitted from the remote user computing device 170 to the unauthorized event detection computing platform 110. In some examples, the registration data may be transmitted during the communication session initiated upon establishing the first wireless connection.

At step 205, the registration data may be received and, at step 206, responsive to receiving the registration data, a registration event may be generated. In some examples, the registration event may include storing registration information, initiating communication with one or more devices or systems, or the like.

Figure 2B:
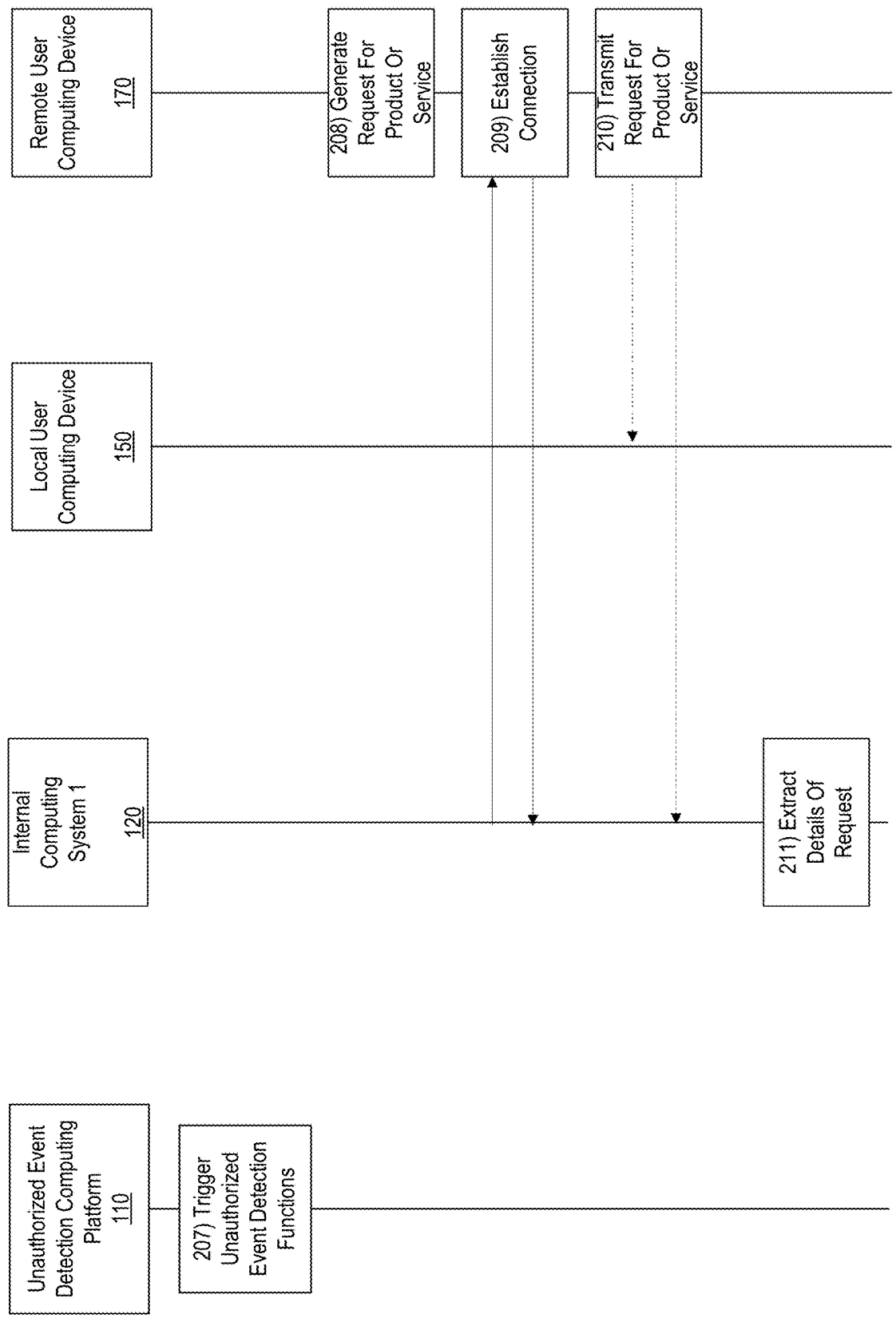

With reference to FIG. 2B, at step 207, one or more unauthorized event detection functions may be triggered. For instance, in some examples, responsive to receiving registration information of a user and/or generating the registration event, one or more unauthorized event monitoring or detection processes may be initiated associated with the user. For instance, the user may be flagged as opting in to the unauthorized event detection monitoring system, one or more accounts associated with the user may be flagged as participating, or the like. Accordingly, as requests for products or services are received from the user or user computing device, unauthorized event detection processes and functions may be executed to evaluate authenticity of the requests.

At step 208, a request for a product or service may be generated by, for instance, remote user computing device 170. For instance, user input may be received by remote user computing device 170 (e.g., via an application executing on the device, via an online application, or the like) requesting a product or service. In some examples, the request may be made via a telephone or in-person conversation with a banking associate, customer service representative, or the like.

At step 209, a connection may be established between the remote user computing device 170 and the internal computing system 1 120. For instance, a second wireless connection may be established between the remote user computing device 170 and the internal computing system 1 120. Upon establishing the second wireless connection, a communication session may be initiated between remote user computing device 170 and internal computing system 1 120.

At step 210, the request for a product or service may be transmitted from the remote user computing device 170 to the internal computing system 1 120 (e.g., via the communication session initiated upon establishing the second wireless connection) and/or the local user computing device 150. For instance, if the request is made via telephone or in person, the customer service associate, banking associate, or the like, may input the request into his or her computing device (e.g., local user computing device 150). Local user computing device 150 may be in communication with internal computing system 1 120 and/or unauthorized event detection computing platform 110 and may transmit information to and receive information from one or more of those or other devices. Additionally or alternatively, if the request is made via an online or mobile application, the request for product or service may be transmitted to the internal computing system 1 120 via the connection described.

At step 211, the request for product or service may be received by internal computing system 1 120 (e.g., either directly from remote user computing device 170 or from local user computing device 150) and one or more details of the request may be extracted. For instance, details such as type of request, amount of request, user associated with request, timing of request, and the like, may be extracted.

Figure 2C:
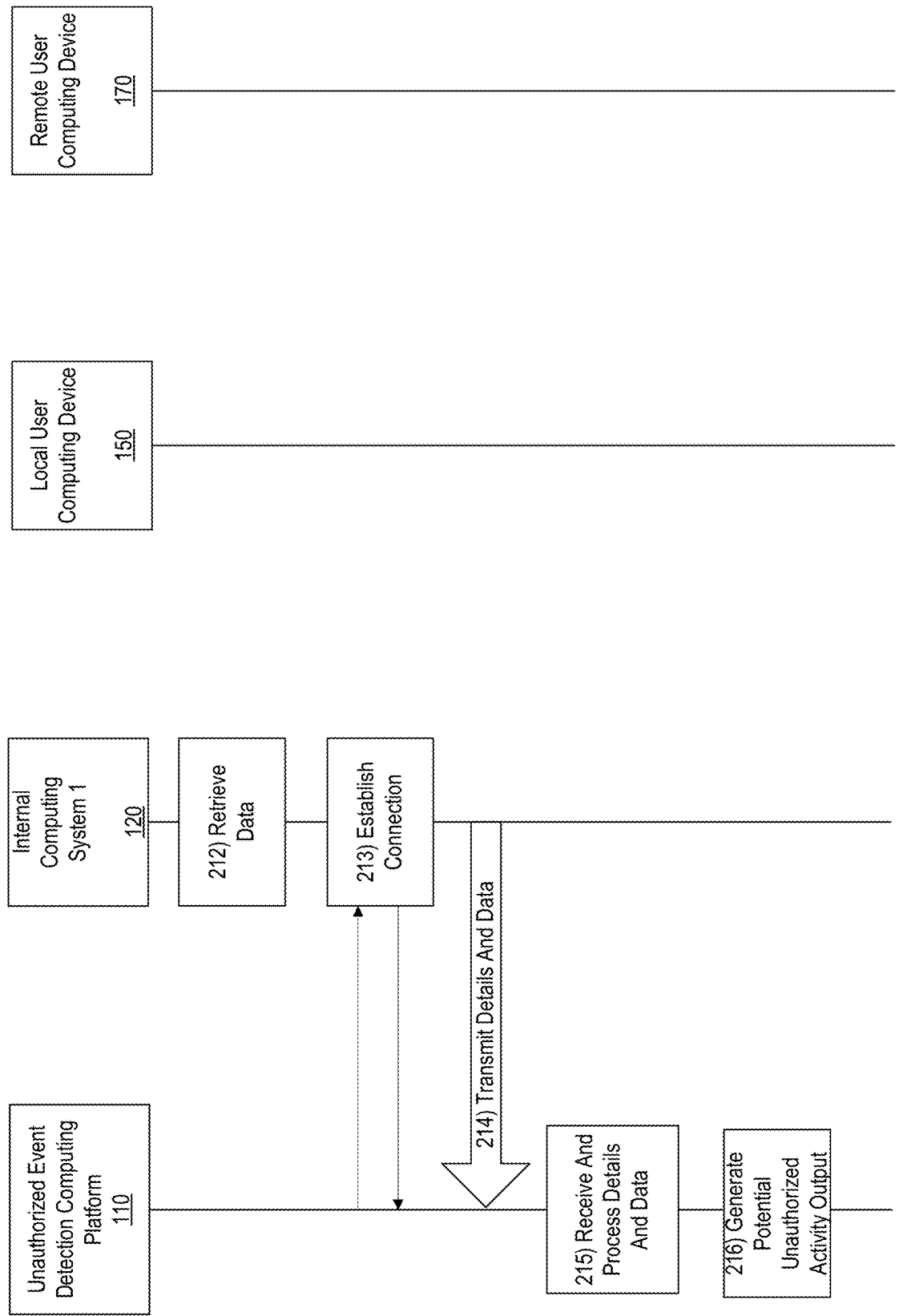

With reference to FIG. 2C, at step 212, data associated with the user, user accounts, user permission, or the like, may be retrieved from internal computing system 1 120. The data may be retrieved based on data extracted from the request for product or services.

At step 213, a connection may be established between the internal computing system 1 120 and the unauthorized event detection computing platform 110. For instance, a third wireless connection may be established between the internal computing system 1 120 and the unauthorized event detection computing platform 110. Upon establishing the third wireless connection, a communication session may be initiated between internal computing system 1 120 and unauthorized event detection computing platform 110.

At step 214, the extracted details of the request for product or services and the retrieved data associated with the user may be transmitted from the internal computing system 1 120 to the unauthorized event detection computing platform 110. In some examples, the extracted details and retrieved data may be transmitted during the communication session initiated upon establishing the third wireless connection.

At step 215, the extracted details and retrieved data may be received by the unauthorized event detection computing platform 110 and processed (e.g., using a cognitive automation model). For instance, the details of the request and retrieved data associated with the user, account, or the like, may be processed using a cognitive automation model to identify or determine whether the request for a product or service is potential unauthorized. For instance, natural language processing and/or other machine learning or processing techniques may be used to evaluate data received to identify patterns, sequences, and the like between the request and previous requests, the request and other actions of the user, and the like. In some examples, the extracted details may include audio data that may be captured (e.g., with the permission of the user) and processed using natural language processing to assess tone, speed of speech or other patterns, keywords or keyword sequences, and the like. The cognitive automation model may compare the output of the natural language processing functions to known patterns of the user (e.g., based on training data obtained via previous interactions with the user, historical data, or the like) to determine whether the request for a product or service is potentially unauthorized.

In some examples, text data may be received and processed using the cognitive automation model. For instance, requests received via online applications, mobile applications, email, or the like, may be analyzed to identify typing patterns, typing anomalies, and the like. For instance, the cognitive automation model may analyze the received information relative to historical or pre-stored information of the user to identify matching characteristics, and the like, in order to determine whether the request is potentially unauthorized.

In some arrangements, analyzing the details and retrieve data may include identifying a category or type of request. One or user selections, keywords, or the like, may be used to categorize the request. This information may then be used by the cognitive automation model to identify or generate requests for additional information.

The cognitive automation model may be trained using historical data including best practices identified or determined from employees who were previously manually performing these functions. For instance, previous occurrences of unauthorized activity, as well as the features and parameters of the request and processing of the unauthorized activity may be used to train the model in order to identify potential issues. Additionally or alternatively, the model may be trained using known scams (e.g., current scams being perpetuated on the Internet, via email, via phone calls, and the like). As current scams appear, the model may be updated (e.g., based on data received from one or more external sources, data feeds, or the like). The model may then be updated and/or validated based on additional outputs generated, feedback received, and the like, to continuously refine accuracy and efficiency.

At step 216, a potential unauthorized event detection output may be generated. For instance, based on the analysis and processing performed at step 215, a determination may be made as to whether the request for product or services is potentially unauthorized. If not, an output of not unauthorized may be generated and the request may be processed. If so, an output of potentially unauthorized may be generated. A notification (e.g., user interface) of the output may be generated.

Figure 2D:
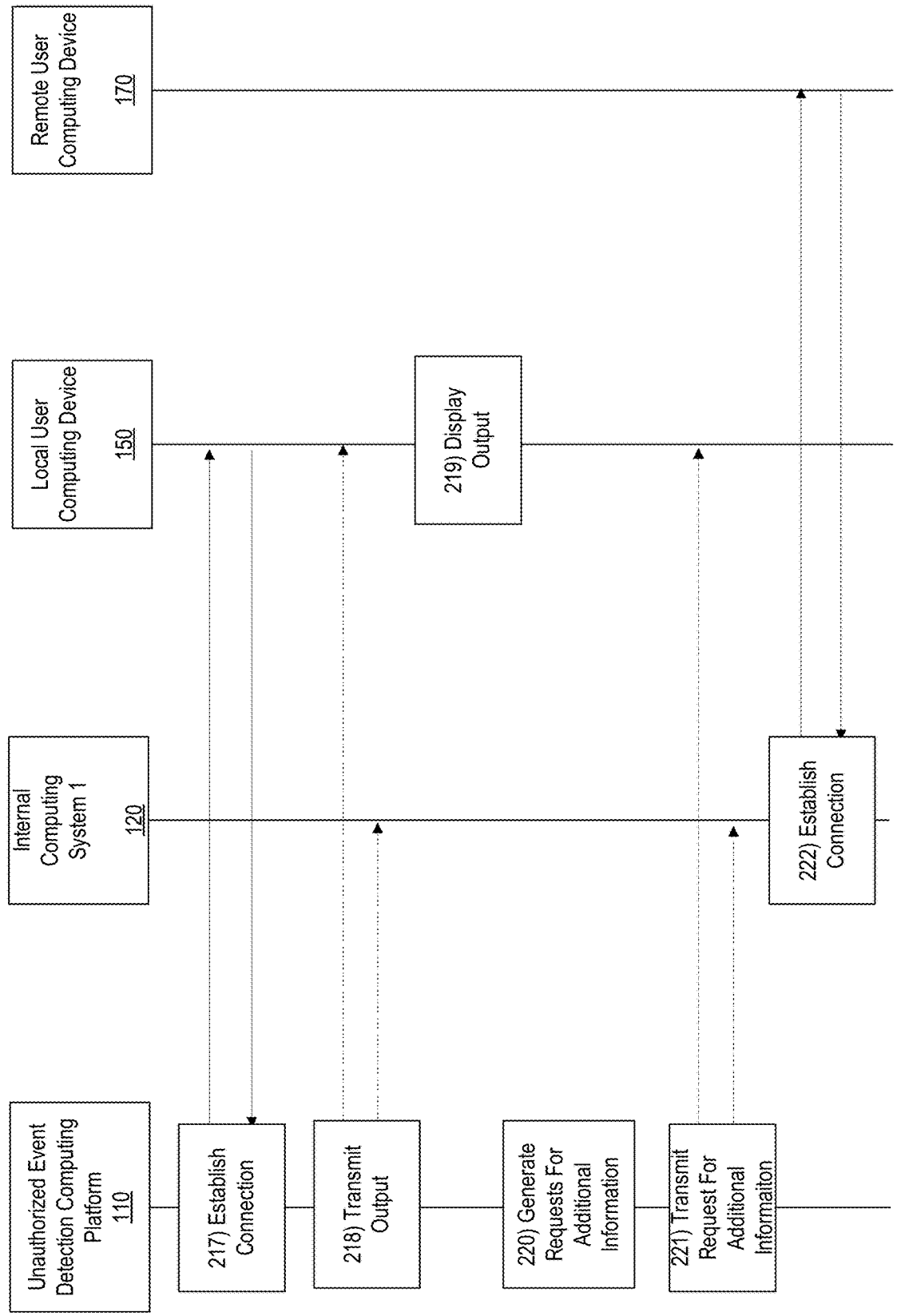

With reference to FIG. 2D, at step 217, a connection may be established between the unauthorized event detection computing platform 110 and local user computing device 150. For instance, a fourth wireless connection may be established between the unauthorized event detection computing platform 110 and local user computing device 150. Upon establishing the fourth wireless connection, a communication session may be initiated between unauthorized event detection computing platform 110 and local user computing device 150.

At step 218, the generated unauthorized event detection output may be transmitted to one or more devices or systems. For instance, the generated output may be transmitted to one or more of internal computing system 1 120, local user computing device 150, and the like. The notification or output may, in some examples, include commands or instructions to take additional action (e.g., pause or prevent further processing of the request for products or services, and the like). In examples in which the generated notification is transmitted to local user computing device 150, the notification may be displayed on a display of local user computing device 150 at step 219.

At step 220, one or more requests for additional information may be generated. For instance, one or more requests for a user to provide additional authentication information (e.g., challenge questions, biometric data, or the like) may be generated. Additionally or alternatively, one or more questions or sequences of questions to be presented to the user (e.g., via the in-person or telephone conversation or via an application executing on remote user computing device 170) may be generated or identified. As discussed above, in some examples, the request(s) for additional information may be based, at least in part, on an identified category of the request for a product or service received from the user.

In some examples, as discussed, the request for additional information may include a request for a user to provide additional authentication information. Additionally or alternatively, one or more questions or sequences of questions may be generated and presented to the user. In some examples, the questions or sequences of questions may be directed at obtaining additional information about the user's request in an effort to determine whether the request is unauthorized.

At step 221, the request for additional information may be transmitted to one or more computing devices (e.g., based on how the request for a product or service was received). For instance, the generated request for additional information may be transmitted to one or more of internal computing system 1 120, local user computing device 150, or the like. If transmitted to local user computing device 150, the operator of that device (e.g., in person banking associated, telephone representative, or the like) may present the request for additional information to the user and may input responses from the user. Additionally or alternatively, if the request for additional information is transmitted to internal computing system 1 120, a connection may be established at step 222 between the internal computing system 1 120 and remote user computing device 170. For instance, a fifth wireless connection may be established between the internal computing system 1 120 and remote user computing device 170. Upon establishing the fifth wireless connection, a communication session may be initiated between internal computing system 1 120 and remote user computing device 170.

Figure 2E:
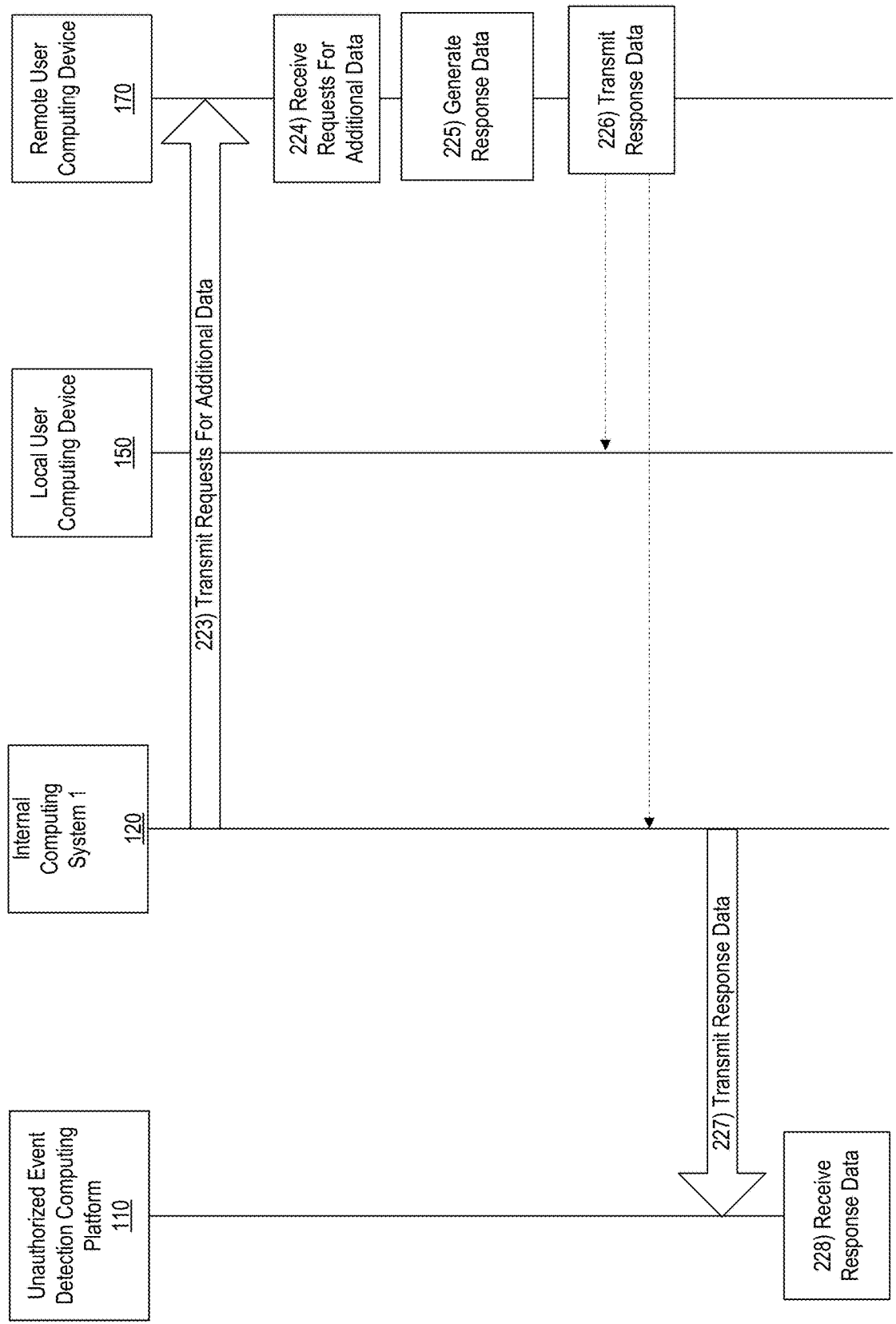

With reference to FIG. 2E, at step 223, the generated requests for additional information may be transmitted from the internal computing system 1 120 to the remote user computing device 170. In some examples, the request for additional information may be transmitted during the communication session initiated upon establishing the fifth wireless connection.

At step 224, the request for additional information may be received by remote user computing device 170 and displayed by a display of the remote user computing device 170. At step 225, additional information response data may be generated. For instance, a user may provide user input (e.g., via touch screen, keypad, voice response, or the like) including a response to the request for additional information. The user input received may be used to generate response data for the request for additional information. In some examples, the response data may be provided by a user via use of the remote user computing device 170 as a telephone.

At step 226, the generated response data may be transmitted to one or more computing devices. For instance, the generated response data may be transmitted to local user computing device 150 and/or internal computing system 1 120. For instance, if the user is providing responses via in person communication, telephone communication, or the like, the response data may be input to the local user computing device 150. Additionally or alternatively, the generated response data may be transmitted to internal computing system 1 120 (e.g., via the communication session initiated upon establishing the fifth wireless connection).

At step 227, response data received by the internal computing system 1 120 may be transmitted to the unauthorized event detection computing platform 110. At step 228, the response data may be received by internal computing system 1 120.

Figure 2F:
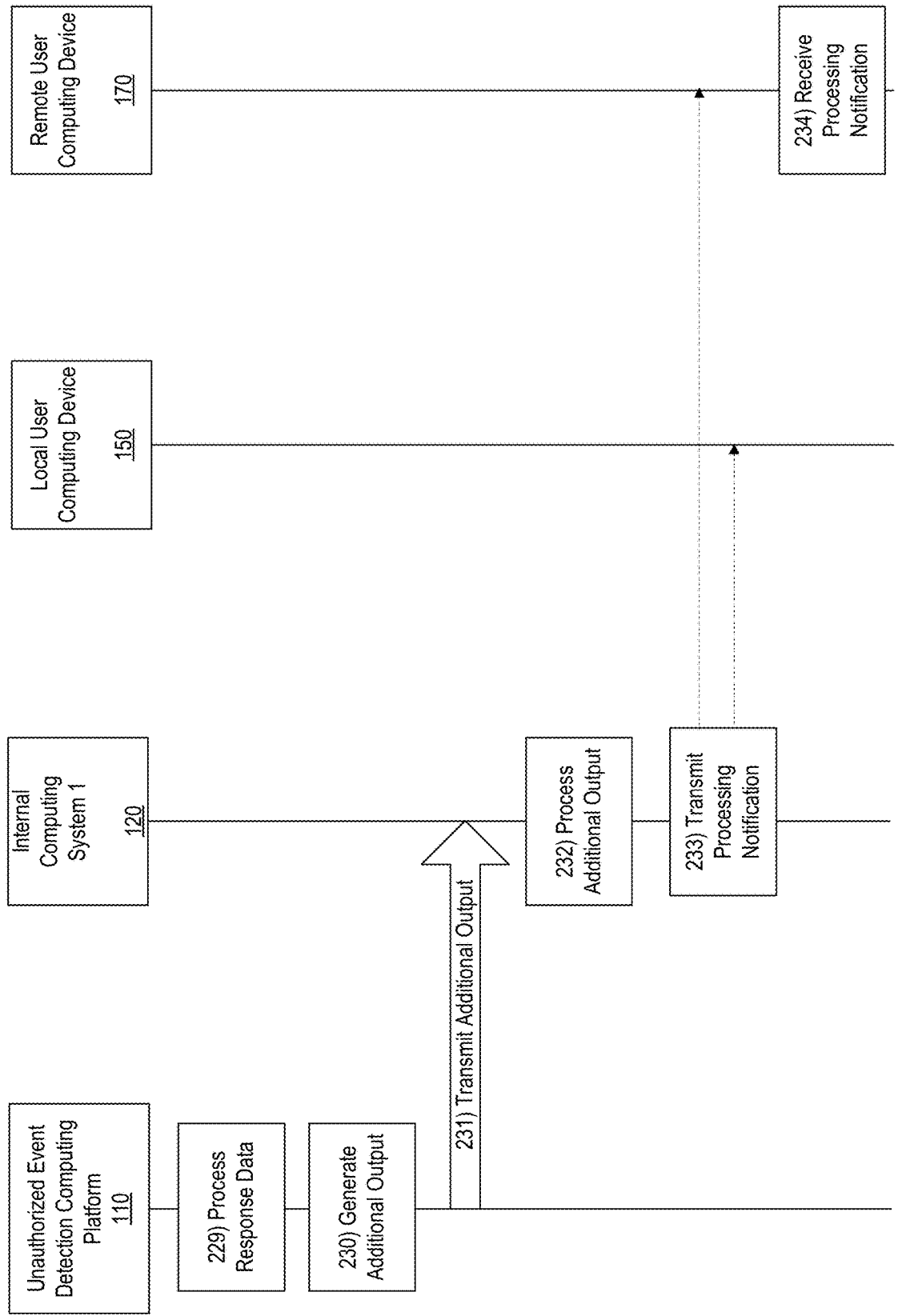

With reference to FIG. 2F, at step 229, the response data may be analyzed and processed using a cognitive automation model. For instance, the response data received may be analyzed using the cognitive automation model to identify patterns or sequences in the response data in order to further determine whether the request for a product or service is unauthorized. For example, based on the responses to the questions or sequences of questions asked of the user, the model may determine whether the request is authorized or unauthorized. In some examples, the system may compare pre-stored authentication data to received authentication data to determine whether there is a match. If so, the request may be deemed authorized.

At step 230, based on the analysis of the response data, an additional output may be generated. For instance, an additional output of whether the request for a product or service is authorized or unauthorized may be generated. In some examples, if there is insufficient data to make a determination, the system may output that the request may be unauthorized but insufficient data is available to make a final determination. In some examples, the additional output may include one or more instructions or commands to execute one or more processes. For instance, the additional output may include an instruction or command to process the request for the product or service, to prevent further processing of the request for the product or service, or the like.

At step 231, the additional output may be transmitted to the internal computing system 1 120. At step 232, the additional output may be received and processed or executed by the internal computing system 1 120. For instance, the instruction or command to process or prevent processing of the request for a product or service may be executed by the internal computing system 1 120.

At step 233, a processing notification may be generated and transmitted to one or more computing devices. For instance, a notification indicating whether the request is processed or is prevented from further processing may be generated and transmitted to one or more devices, such as local user computing device 150 and/or remote user computing device 170. The processing notification may be received by the local user computing device 150 and the output may be presented to the user (e.g., by a customer service representative).

At step 234, the processing notification may be received by remote user computing device 170 (e.g., via an application executing on the remote user computing device 170) and displayed by a display of the remote user computing device 170.

Figure 2G:
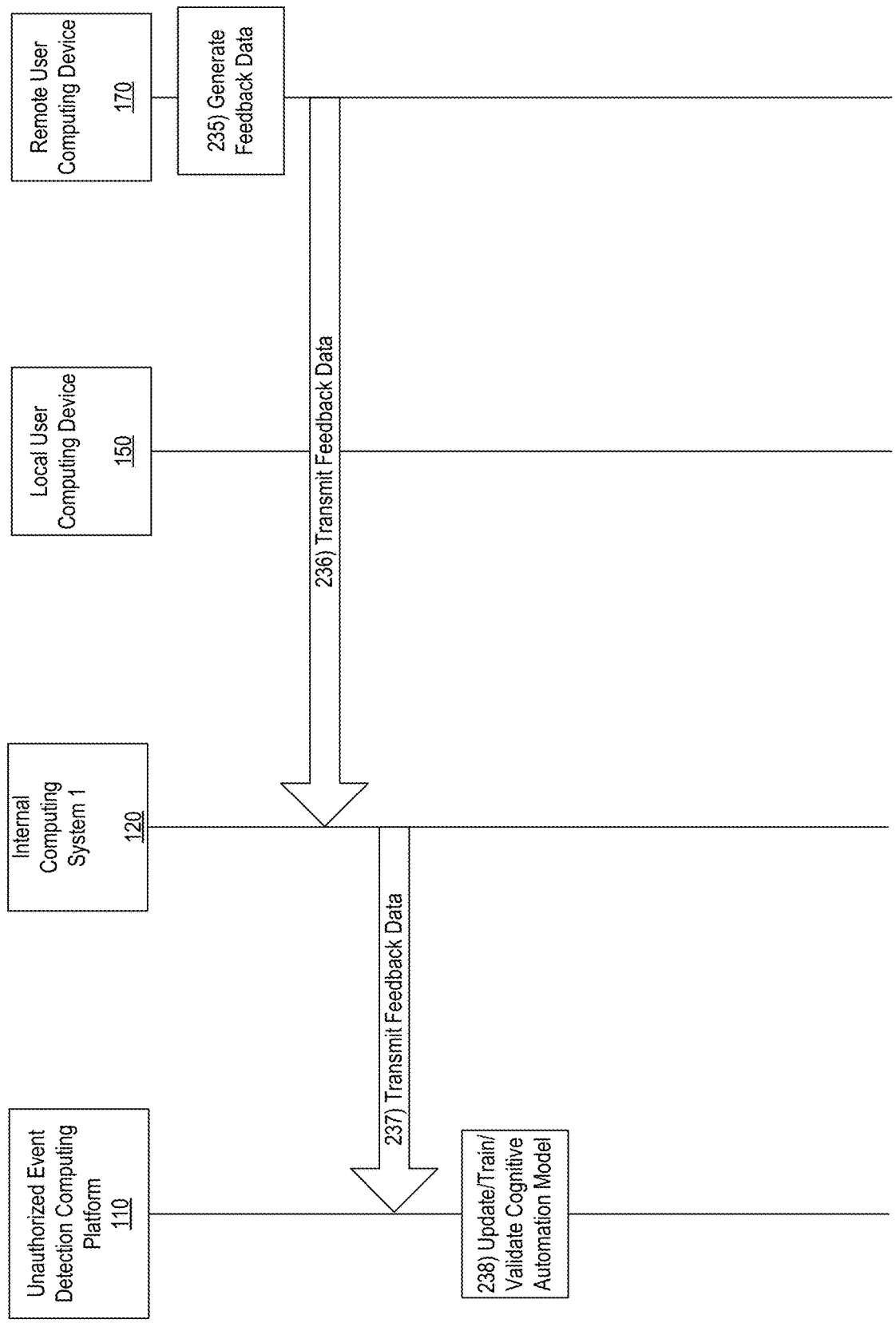

With reference to FIG. 2G, at step 235, feedback data may be received by the remote user computing device 170. For instance, user response data indicating acceptance of the processing output, disagreement with the processing output, providing additional information, or the like, may be received. At step 236, the received feedback data may be transmitted from the remote user computing device 170 to the internal computing system 1 120.

At step 237, the feedback data may be transmitted from the internal computing system 1 120 to the unauthorized event detection computing platform 110. In some examples, the feedback data may be transmitted during a previously establishing communication session. In other arrangements, additional wireless connections may be established and communication sessions initiated.

At step 238, the feedback data may be received by the unauthorized event detection computing platform 110 and may be used to train, update and/or validate the cognitive automation model used to detect or identify potential unauthorized events, generate and evaluate requests for additional information and response data, and the like. Accordingly, the model may be continually being updated and refined to generate appropriate recommendations.

Figure 3:
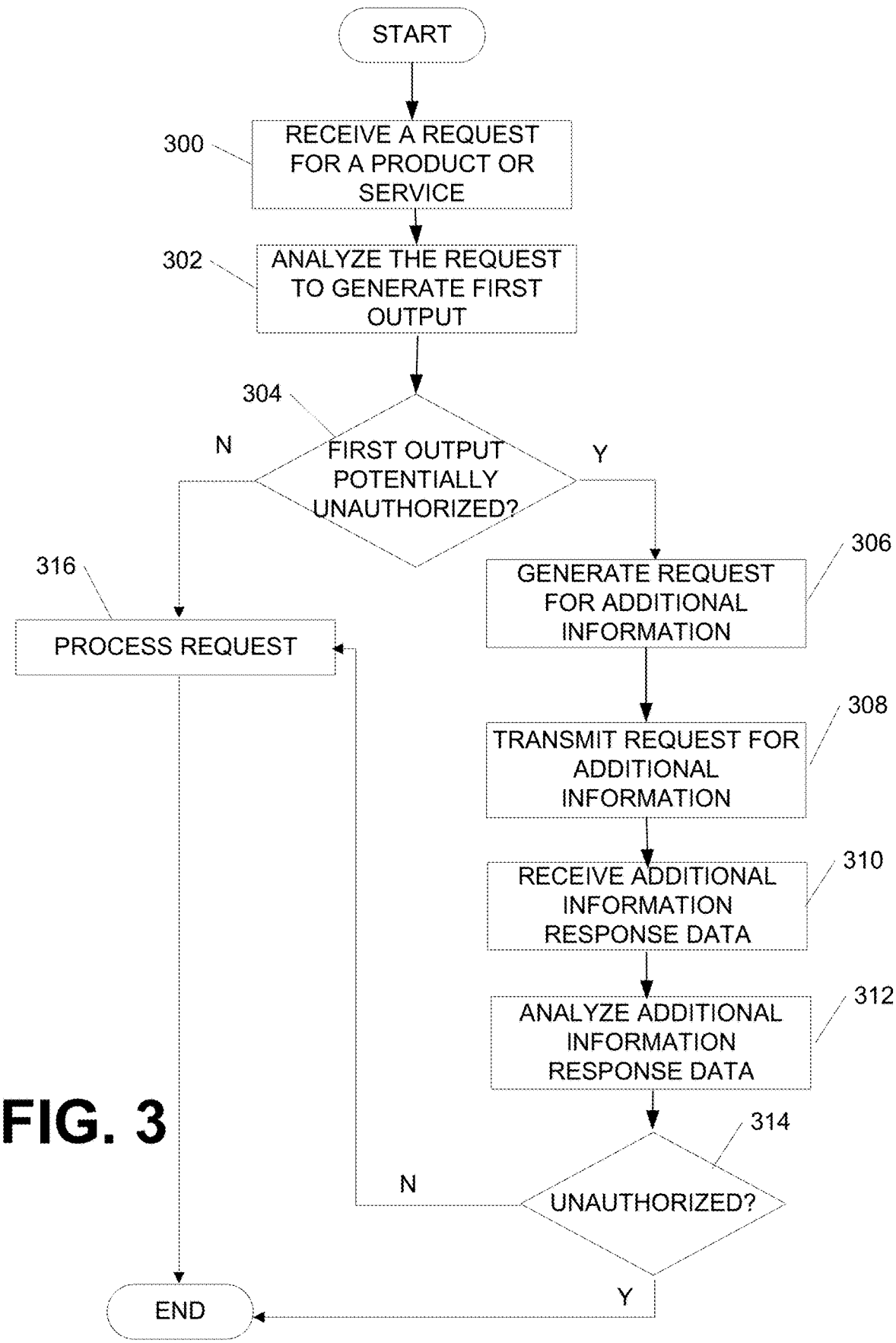
FIG. 3 depicts an illustrative method for implementing and using dynamic unauthorized event detection functions according to one or more aspects described herein.

FIG. 3 is a flow chart illustrating one example method of implementing cognitive automation techniques to perform unauthorized event detection functions according to one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described.

At step 300, a request for a product or service may be received. For instance, the request for a product or service may be received via an application executing on a remote user computing device. Additionally or alternatively, the request for a product or service may be received via a telephone exchange (e.g., audio data may be received), via an in-person exchange, via email, or the like.

At step 302, the received request for the product or service may be analyzed using a cognitive automation model. For instance, if the request is an audio request, audio data may be analyzed (e.g., using natural language processing) to identify keywords, keyword sequences, tone, sentiment, or the like, in the request. This data may be processed using the cognitive automation model to evaluate whether the request is unauthorized.

Additionally or alternatively, if the request is received via an in-person exchange, the exchange may be recorded (e.g., with permission of the user) and analyzed or the customer service representative or banking associate may input data into a computing device and the input data may be analyzed using the cognitive automation model.

In some examples, the request may be received electronically, such as via an online application, mobile application, email, or the like. The data associated with the request may be analyzed using the cognitive automation model to determine whether it is unauthorized.

At step 304, a first output of the analysis may be analyzed to determine whether the request is potentially unauthorized. For instance, based on the analysis, the system may generate a first output indicating whether the request for the product or service is potentially unauthorized. If not, the request may be processed at step 316 and the process may end.

If, at step 304, the first output includes an indication that the request for a product or service is potentially unauthorized, one or more requests for additional information may be generated at step 306. For instance, a request for additional authentication information, such as biometric data, username and password, personal identification number, response to challenge questions, multi-factor authentication requiring a response from a second computing device, and the like, may be generated. Additionally or alternatively, the request for additional information may include one or more questions or sequences of questions designed to obtain or extract additional information from the user that may be used to further evaluate the authenticity of the request. For instance, one or more questions or sequences of questions requesting additional information to assess the motivation behind the request (e.g., is this truly the user and, if so, why are they making this request at this time) may be generated. In some examples, the sequence of questions may include questions generated based on a response to a previous question or one question may build on a previous question such that the questions will be presented and answered in a predetermined order.

At step 308, the one or more requests for additional information may be transmitted to one or more computing devices. For instance, the generated one or more requests for additional information may be transmitted to a remote user computing device (e.g., the user device from which the request was received), to a local user computing device associated with the entity and having an operator who may then present the requests for additional information to the user, and the like.

At step 310, additional information response data may be received. For instance, a user may provide user input (e.g., text, option selection, audio, or the like) to the remote user computing device including responses to the one or more requests for additional information. This information may then be used to generate additional information response data. Additionally or alternatively, the user may provide responses to a customer service representative, banking associate, or the like, who may then input the response data into a computing device, such as local user computing device. The generated response data may then be transmitted to the unauthorized event detection computing platform.

At step 312, the additional information response data may be analyzed using the cognitive automation model. For instance, response data may be analyzed to identify patterns or sequences in the data which may indicate whether the request for a product or service is unauthorized.

In some examples, analyzing the additional information response data may include scoring the response to each question. For instance, the additional information response data may be received and the unauthorized event detection computing platform 110 may generate a score for each response received (e.g., using the cognitive automation model). In some examples, the score may be indicative of a level of risk associated with the response. For instance, a higher score may indicate a greater risk that the request for the product or service is unauthorized. Accordingly, the scores for responses to each question presented to the user may be added to determine an overall score. The overall score may then be compared to a threshold (e.g., determine by the cognitive automation model, input by a supervisory user, based on historical data, or the like) to determine an output of, for example, authorized or unauthorized.

Accordingly, based on the analysis, a second output may be generated and, at step 314, a determination may be made as to whether the second output indicates that the request is unauthorized. If not, the request may be processed at step 316. If the second output indicates that the request is unauthorized, the request for the product or service might not be processed, a notification of processing failure may be transmitted to the requesting user, and the process may end.

FIG. 4 illustrates one example user interface that may be provided to a customer service representative, user, or the like. The interface 400 includes an indication that the request for the product or service is identified as potentially unauthorized (e.g., as determined by the cognitive automation model) and identifies requests for additional information to be presented to the user. For instance, the requests for additional information include additional authentication information, additional information about the purpose of the request, and the like. Various other types of additional information or questions for the user may be identified, generated and/or presented without departing from the invention.

FIG. 5 illustrates one example user interface that may be provided to a user in accordance with one or more aspects described herein. The interface 500 includes an indication that the request for a product or service has been determined to be unauthorized and provides options for the user to accept the decision or appeal it (e.g., enter a new request, provide further information, schedule an appointment with a representative to discuss options, or the like).

As discussed herein, aspects described relate to using cognitive automation techniques to provide unauthorized event detection and processing functions. For instance, as requests for event processing (e.g., products or services) are received, they may be analyzed using a cognitive automation model that may leverage far more information and data than a human could in making a determination as to whether the request is unauthorized.

As discussed herein, requests for a product or service may be received via an in-person request, via a telephone communication, via an application executing on a mobile device, via an online application, via an email, or the like. The cognitive automation model may be configured to analyze data receive from any channel of communication (and/or multiple channels of communication) to determine whether the request is authorized. As discussed herein, in some examples, an initial determination of whether a request is potentially unauthorized may be generated. In response, one or more requests for additional information may be generated and responses to the one or more requests may be analyzed to determine whether the potentially unauthorized request is unauthorized. The one or more requests for additional information may be generated in order to mimic a human response to an indication that an event is potentially unauthorized. That is, a human may then ask for additional identification, ask additional questions about the request, and the like, in order to gain more information to make an informed decision about whether the request is actually unauthorized. The cognitive automation model may generate appropriate requests for additional information that may be targeted to a particular type of request, keywords identified, or the like, in order to obtain the additional information necessary to make an accurate determination.

In some examples, certain types of requests may automatically initiate the generation of requests for additional information without the cognitive automation model generating a first output of potentially unauthorized. For instance, certain requests or categories of requests (e.g., opening a new account, adding an additional user to an account, identifying a power of attorney, or the like) may automatically trigger generation of requests for additional information.

The arrangements described herein may be used to detect unauthorized activity in multiple scenarios. For instance, in situations in which the user making the request is an authorized user but the request is being made under duress (e.g., another person is forcing the user to make the request) or under circumstances that leave the user not fully informed (e.g., a scam being perpetrated by an unauthorized user asking for funds to help a family member who they claim is in trouble but actually isn't, asking for funds to settle an alleged debt that is not real, or the like), the system may aid in detecting and mitigating an impact of the unauthorized request. Additionally or alternatively, in situations in which the user is not an authorized user (e.g., an unauthorized actor) the system may detect the unauthorized use, control response actions and mitigate impact of the potential unauthorized request. Accordingly, the arrangements can evaluate whether a requesting user is authorized or authentic, as well as whether the requested event is authorized.

As discussed herein, the request for a product or service may be received through one or more different channels, including electronic channels such as email, online application, mobile application, or the like. Additionally or alternatively, requests may be received via telephone or in-person communication with a customer service representative, banking associate, or the like. In some examples, the user may provide audio or spoken responses to questions, which may be analyzed using natural language processing to input data into the cognitive automation model. In some examples, the audio data may be a recording recorded with user permission.

Additionally or alternatively, the customer service representative, banking associate, or the like, may input data (e.g., response data) into a local computing device that may then be analyzed by the model to make one or more determinations. Requests for additional information, and the like, may be presented to the requesting user by the customer service representative or banking associate and the responses may be input for further analysis.

In some examples, the customer service representative or banking associate may provide additional data or observations associated with the requesting user. For instance, if the user is sweating, stammering, seems confused, has a sense of urgency, is requesting sensitive information outside of a normal request, or the like, the customer service representative or banking associate may observe these behaviors and input the observation into the system. In some examples, the user may score certain observed behaviors of the user in order to identify more pronounced behaviors. The cognitive automation model may then also evaluate these inputs when determining whether the request is unauthorized.

As discussed, aspects described herein may be performed in real-time or near real-time in order to efficiently identify potential unauthorized activity and take quick action to mitigate any impact of the unauthorized activity (e.g., prevent processing of the request).

In some examples, historical event requests of the user may be used to evaluate whether a request is authorized. For instance, if a user has never requested a wire transfer and is now requesting one, the request may be flagged as potentially unauthorized and additional information may be requested in order to determine whether the request is actually unauthorized.

The request for additional information may include requests for various types of information. For instance, the request for additional information may include initiation of multi-factor authentication and may require a user to input a code transmitted to a pre-stored device different from the device on which the user is making the request (e.g., from a second mobile device, tablet, wearable device or the like, different from the computing device being used to transmit the request). In another example, the user may be required to provide user input via a pre-stored device (e.g., select "verify" option on an interactive user interface transmitted to one or more computing devices (e.g., the requesting device or another computing device). These arrangements may be implemented regardless of the channel through which the request was received but may also be used when making an in-person or telephone request (e.g., verify identity via a pre-stored mobile device).

In some examples, a request for additional authentication information may include biometric data obtained and used with permission of the user. For instance, a user may provide a finger print, facial recognition, or the like, as additional authentication information. In some examples, biometric data such as walking gait, resting heartrate, or the like may be used to verify identity.

In some examples, the request for additional information may include a request to response to a question or series or sequence of questions. For instance, if a user is requesting to change or add a power of attorney, a series of questions may be generated that may prompt the user to provide additional information that may enable the system to determine whether the user is making the request under duress. The questions may be directly presented to the user via a computing device of the user and/or may be presented to the user by the customer service representative or baking associate.

In evaluating an electronic request, the system may evaluate grammar, spelling, and the like, as compared to historical data of the user and/or publicly available data (e.g., syntax in known scams). Further, typing patterns, voice patterns, and the like, of the user may be evaluated in at least some examples. The cognitive automation model may compare the data received from the user to baseline or historical data associated with the user and/or data associated with a plurality of users (e.g., all user data, users of a similar demographic, or the like). Accordingly, vast amounts of data may be leveraged in making the determinations.

In some examples, the questions may be challenge questions having pre-stored answers or may be generated based on other information associated with the user and available to the entity (e.g., available to the entity but not available or not widely available outside the entity). For instance, data associated with the user and stored (e.g., with permission) by the entity may be used to generate challenge questions and verify identity of a user based on responses to the questions. In some examples, publicly available information may also be used to generate the questions/accurate responses. Sophisticated unauthorized actors may have access to vast amounts of data for a user (e.g., from a data breach, or the like). However, the arrangements described herein can rely on even greater amounts of data or different types of data to verify authenticity of a request.

In some examples, responses to the request for additional information may cause the system to identify even further questions for processing. In some examples, the further questions may include questions that may aid in identifying the perpetrator of the unauthorized activity, may obtain information that law enforcement may use, and the like.

The arrangements discussed herein enable dynamic detection of unauthorized activity because the model may be continuously updated and types of additional information requested, as well as how the information is analyzed may be updated with each new update of the model. Further, it enables dynamic authentication of users by evaluating requested events and requesting varying types of authentication based on an evaluation of the event request.

Figure 6:
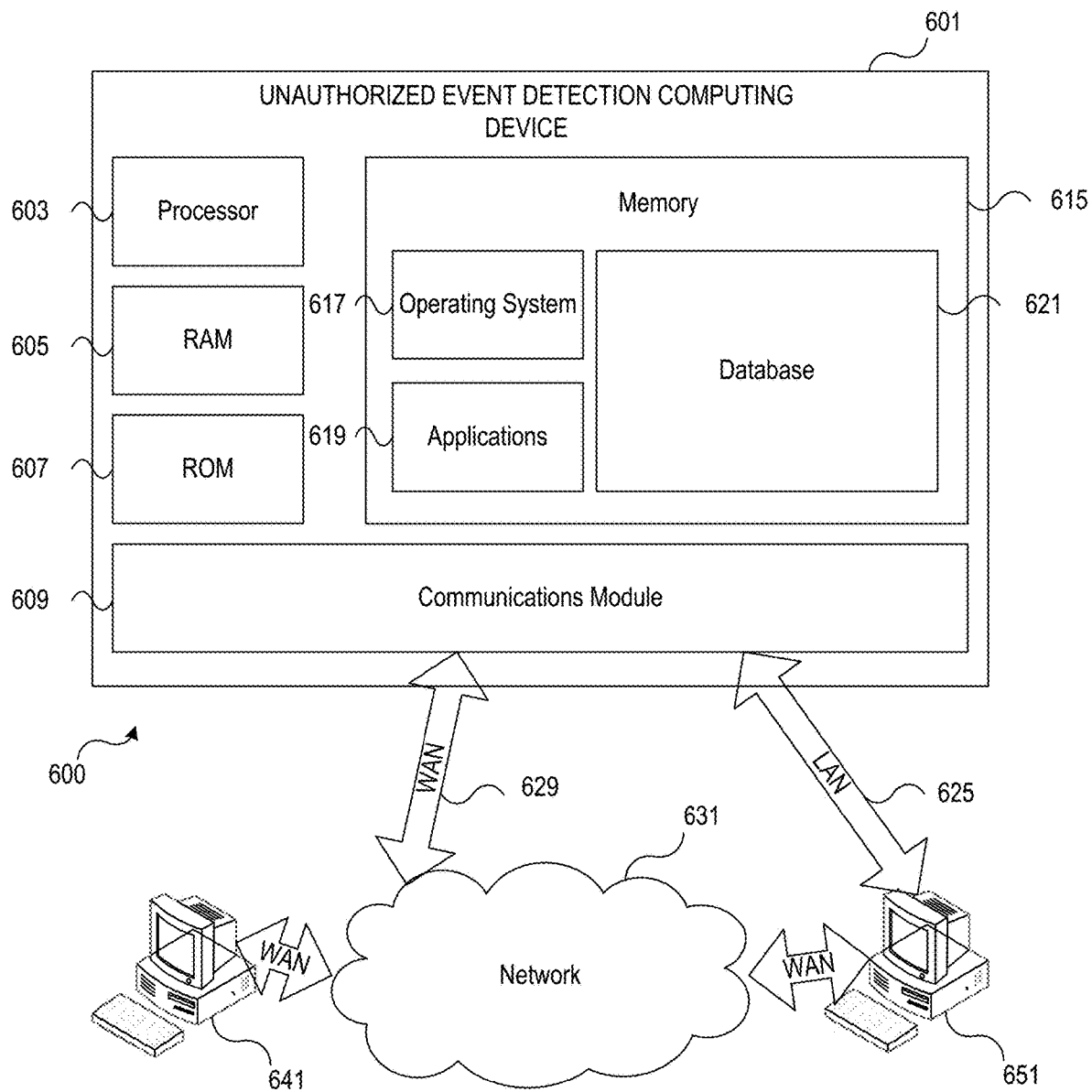
FIG. 6 illustrates one example environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include unauthorized event detection computing device 601 having processor 603 for controlling overall operation of unauthorized event detection computing device 601 and its associated components, including Random Access Memory (RAM) 605, Read-Only Memory (ROM) 607, communications module 609, and memory 615. Unauthorized event detection computing device 601 may include a variety of computer readable media. Computer readable media may be any available media that may be accessed by unauthorized event detection computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by unauthorized event detection computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on unauthorized event detection computing device 601. Such a processor may execute computer-executable instructions stored on a computer-readable medium.

Software may be stored within memory 615 and/or storage to provide instructions to processor 603 for enabling unauthorized event detection computing device 601 to perform various functions as discussed herein. For example, memory 615 may store software used by unauthorized event detection computing device 601, such as operating system 617, application programs 619, and associated database 621. Also, some or all of the computer executable instructions for unauthorized event detection computing device 601 may be embodied in hardware or firmware. Although not shown, RAM 605 may include one or more applications representing the application data stored in RAM 605 while unauthorized event detection computing device 601 is on and corresponding software applications (e.g., software tasks) are running on unauthorized event detection computing device 601.

Communications module 609 may include a microphone, keypad, touch screen, and/or stylus through which a user of unauthorized event detection computing device 601 may provide input, and may also include one or more of a speaker for providing audio output and a video display device for providing textual, audiovisual and/or graphical output. Computing system environment 600 may also include optical scanners (not shown).

Unauthorized event detection computing device 601 may operate in a networked environment supporting connections to one or more remote computing devices, such as computing devices 641 and 651. Computing devices 641 and 651 may be personal computing devices or servers that include any or all of the elements described above relative to unauthorized event detection computing device 601.

The network connections depicted in FIG. 6 may include Local Area Network (LAN) 625 and Wide Area Network (WAN) 629, as well as other networks. When used in a LAN networking environment, unauthorized event detection computing device 601 may be connected to LAN 625 through a network interface or adapter in communications module 609. When used in a WAN networking environment, unauthorized event detection computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

Figure 7:
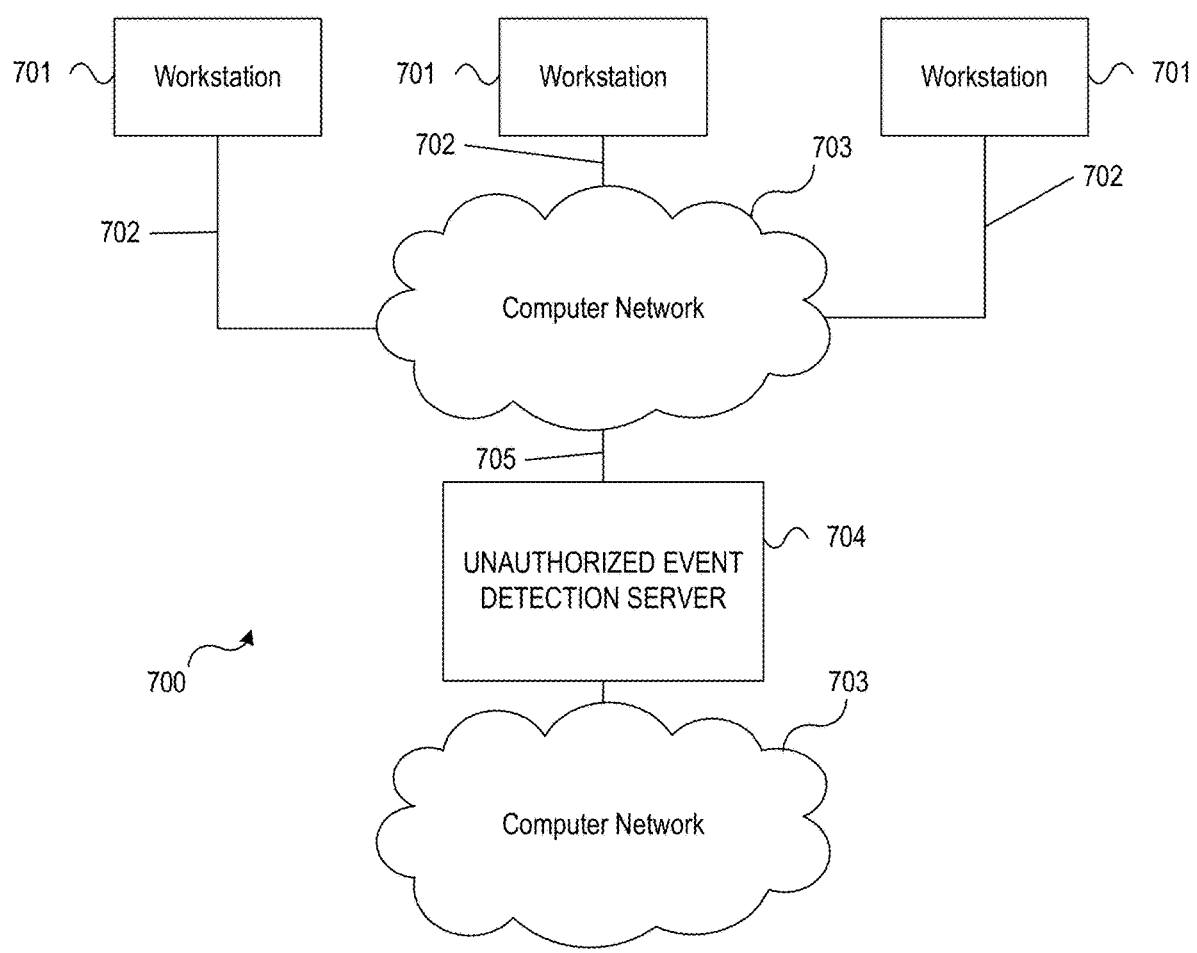
FIG. 7 depicts an illustrative block diagram of workstations and servers that may be used to implement the processes and functions of certain aspects of the present disclosure in accordance with one or more aspects described herein.

FIG. 7 depicts an illustrative block diagram of workstations and servers that may be used to implement the processes and functions of certain aspects of the present disclosure in accordance with one or more example embodiments. Referring to FIG. 7, illustrative system 700 may be used for implementing example embodiments according to the present disclosure. As illustrated, system 700 may include one or more workstation computers 701. Workstation 701 may be, for example, a desktop computer, a smartphone, a wireless device, a tablet computer, a laptop computer, and the like, configured to perform various processes described herein. Workstations 701 may be local or remote, and may be connected by one of communications links 702 to computer network 703 that is linked via communications link 705 to unauthorized event detection server 704. In system 700, unauthorized event detection server 704 may be a server, processor, computer, or data processing device, or combination of the same, configured to perform the functions and/or processes described herein. Server 704 may be used to receive requests for products or services, execute a cognitive automation model to identify potentially unauthorized requests, generate or identify requests for additional information, analyze additional information response data to identify unauthorized activity, and the like.

Computer network 703 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 702 and 705 may be communications links suitable for communicating between workstations 701 and unauthorized event detection server 504, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   a memory storing computer-readable instructions that, when executed by the at least one processor, cause the computing platform to:
   receive a request for a financial transaction, wherein the request for the financial transaction includes audio data received via one of: a telephone channel or an in-person exchange;
   determine whether the requested financial transaction is a first type of transaction;
   responsive to determining that the requested financial transaction is not a first type of transaction:
   determine, using a cognitive automation model, whether the request for the financial transaction is potentially unauthorized, wherein determining, using the cognitive automation model, whether the request for the transaction is potentially unauthorized includes analyzing at least speech patterns in audio data using natural language processing;
   responsive to determining that the request for the financial transaction is not potentially unauthorized, process the request for the financial transaction;
   responsive to determining one of: the requested financial transaction is a first type of transaction or the request for the financial transaction is potentially unauthorized:
   identify, using the cognitive automation model, a request for additional information;
   transmit the request for additional information to one or more computing devices;
   receive, from the one or more computing devices, additional information response data;
   determine, using the cognitive automation model, whether the one of: the requested financial transaction of the first type or the potentially unauthorized request for the financial transaction is unauthorized based at least on the additional information response data;
responsive to determining that the one of: the requested financial transaction of the first type or the potentially unauthorized request for the financial transaction is not unauthorized, process the request for the financial transaction; and
responsive to determining that the one of: the requested financial transaction of the first type or the potentially unauthorized request for the financial transaction is unauthorized, preventing processing of the request for the financial transaction.

2. The computing platform of claim 1, wherein the additional information includes additional authentication data.

3. The computing platform of claim 2, wherein the additional authentication data includes multi-factor authentication relying on multiple computing devices.

4. The computing platform of claim 1, wherein the additional information includes a sequence of questions.

5. The computing platform of claim 4, wherein determining, using the cognitive automation model, whether the one of: the requested financial transaction of the first type or the potentially unauthorized request for the financial transaction is unauthorized based at least on the additional information response data further includes:
identifying a score for response data associated with each question of the sequence of questions;
summing the scores for the response data associated with each question to determine an overall score;
comparing the overall score to a threshold; and
responsive to determining that the overall score is at or above the threshold, determining that the request for the financial transaction is unauthorized.

6. The computing platform of claim 4, wherein the sequence of questions includes a plurality of questions to be answered in a predetermined order.

7. The computing platform of claim 1, wherein analyzing the at least speech patterns in the audio data using natural language processing includes analyzing the at least speech patterns of a user making the request and determining, based on the analyzing, whether the user is under duress.

8. A method, comprising:
receiving, by a computing platform having a memory and at least one processor, a request for a financial transaction, wherein the request for the financial transaction includes audio data received via one of: a telephone channel or an in-person exchange;
determining, by the at least one processor, whether the requested financial transaction is a first type of transaction;
responsive to determining that the requested financial transaction is not a first type of transaction:
determining, by the computing platform and using a cognitive automation model, whether the request for the transaction is potentially unauthorized, wherein determining, using the cognitive automation model, whether the request for the transaction is potentially unauthorized includes analyzing at least speech patterns in audio data using natural language processing;
when it is determined that the request for the financial transaction is not potentially unauthorized, processing, by the computing platform, the request for the financial transaction;
when it is determined that one of: the requested financial transaction is a first type of transaction or the request for the financial transaction is potentially unauthorized:
identifying, by the computing platform and using the cognitive automation model, a request for additional information;
transmitting, by the computing platform, the request for additional information to one or more computing devices;
receiving, by the computing platform and from the one or more computing devices, additional information response data;
determining, by the computing platform and using the cognitive automation model, whether the one of: the requested financial transaction of the first type or the potentially unauthorized request for the financial transaction is unauthorized based at least on the additional information response data;
when it is determined that the one of: the requested financial transaction of the first type or the potentially unauthorized request for the financial transaction is not unauthorized, processing, by the computing platform, the request for the financial transaction; and
when it is determined that the one of: the requested financial transaction of the first type or the potentially unauthorized request for the financial transaction is unauthorized, preventing processing, by the computing platform, of the request for the financial transaction.

9. The method of claim 8, wherein the additional information includes additional authentication data.

10. The method of claim 9, wherein the additional authentication data includes multi-factor authentication relying on multiple computing devices.

11. The method of claim 8, wherein the additional information includes a sequence of questions.

12. The method of claim 11, wherein determining, by the computing platform and using the cognitive automation model, whether the one of: the requested financial transaction of the first type or the potentially unauthorized request for the financial transaction is unauthorized based at least on the additional information response data further includes:
identifying, by the computing platform, a score for response data associated with each question of the sequence of questions;
summing, by the computing platform, the scores for the response data associated with each question to determine an overall score;
comparing, by the computing platform, the overall score to a threshold; and
responsive to determining that the overall score is at or above the threshold, determining, by the computing platform, that the request for the financial transaction is unauthorized.

13. The method of claim 11, wherein the sequence of questions includes a plurality of questions to be answered in a predetermined order.

14. One or more non-transitory computer-readable media storing instructions that, when executed by a computing platform comprising at least one processor, memory, and a communication interface, cause the computing platform to:
receive a request for a financial transaction, wherein the request for the financial transaction includes audio data received via one of: a telephone channel or an in-person exchange;

determine whether the requested financial transaction is a first type of transaction;
responsive to determining that the requested financial transaction is not a first type of transaction:
  determine, using a cognitive automation model, whether the request for the financial transaction is potentially unauthorized, wherein determining, using the cognitive automation model, whether the request for the transaction is potentially unauthorized includes analyzing at least speech patterns in audio data using natural language processing;
  responsive to determining that the request for the financial transaction is not potentially unauthorized, processing the request for the financial transaction;
  responsive to determining one of: the requested financial transaction is a first type of transaction or the request for the financial transaction is potentially unauthorized:
    identify, using the cognitive automation model, a request for additional information;
    transmit the request for additional information to one or more computing devices;
    receive, from the one or more computing devices, additional information response data;
    determine, using the cognitive automation model, whether the one of: the requested financial transaction of the first type or the potentially unauthorized request for the financial transaction is unauthorized based at least on the additional information response data;
    responsive to determining that the one of: the requested financial transaction of the first type or the potentially unauthorized request for the financial transaction is not unauthorized, processing the request for the financial transaction; and
    responsive to determining that the one of: the requested financial transaction of the first type or the potentially unauthorized request for the financial transaction is unauthorized, preventing processing of the request for the financial transaction.

15. The one or more non-transitory computer-readable media of claim 14, wherein the additional information includes additional authentication data.

16. The one or more non-transitory computer-readable media of claim 15, wherein the additional authentication data includes multi-factor authentication relying on multiple computing devices.

17. The one or more non-transitory computer-readable media of claim 14, wherein the additional information includes a sequence of questions.

18. The one or more non-transitory computer-readable media of claim 17, wherein determining, using the cognitive automation model, whether the one of: the requested financial transaction of the first type or the potentially unauthorized request for the financial transaction is unauthorized based at least on the additional information response data further includes:
  identifying a score for response data associated with each question of the sequence of questions;
  summing the scores for the response data associated with each question to determine an overall score;
  comparing the overall score to a threshold; and
  responsive to determining that the overall score is at or above the threshold, determining that the request for the financial transaction is unauthorized.

19. The one or more non-transitory computer-readable media of claim 17, wherein the sequence of questions includes a plurality of questions to be answered in a predetermined order.

\* \* \* \* \*